No. 861,554. PATENTED JULY 30, 1907.
C. C. TAINTOR.
SAW SETTING IMPLEMENT.
APPLICATION FILED MAR. 11, 1907.

WITNESSES:

INVENTOR.
Charles C. Taintor.
BY
Dunn, Turk & Clark
ATTORNEYS.

UNITED STATES PATENT OFFICE.

CHARLES C. TAINTOR, OF ELIZABETH, NEW JERSEY, ASSIGNOR TO TAINTOR MANUFACTURING COMPANY, OF NEW YORK, N. Y., A CORPORATION OF NEW YORK.

SAW-SETTING IMPLEMENT.

No. 861,554.   Specification of Letters Patent.   Patented July 30, 1907.

Application filed March 11, 1907. Serial No. 361,819.

*To all whom it may concern:*

Be it known that I, CHARLES C. TAINTOR, a citizen of the United States, residing in Elizabeth, in the county of Union and State of New Jersey, have invented certain new and useful Improvements in Saw-Setting Implements, of which the following is a full, clear, and exact specification.

This invention relates to saw setting devices such as are intended for bending and setting the teeth of saws.

The principal object of the present invention is to improve the construction and arrangement of the plunger of such device in such manner that it will automatically adjust itself to saw blades of different thicknesses during the operation of setting the teeth.

A further object of the invention is to cause the plunger to engage the saw teeth adjacent the base thereof and subsequently to contact with said teeth and exert pressure thereon nearer to the point thereof, whereby the liability of breaking a tooth during the setting operation is overcome.

With the foregoing and other objects in view, which will appear as the description proceeds, the invention resides in the combination and arrangement of parts and in the details of construction hereinafter described and claimed, it being understood that changes in the precise embodiment of invention herein set forth can be made within the scope of the following claims without departing from the spirit of the invention.

Figure 1:
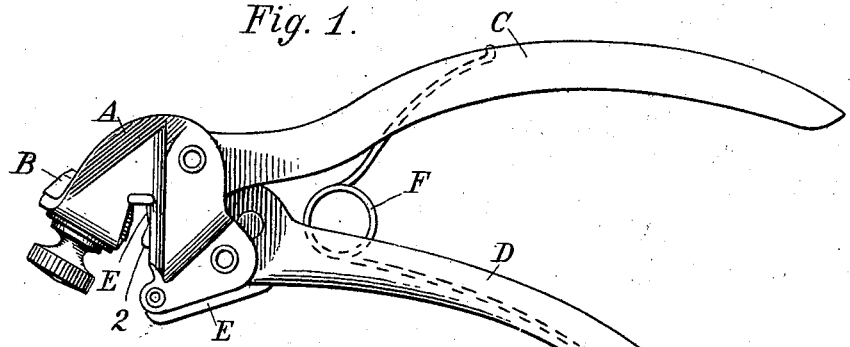
Figure 2:
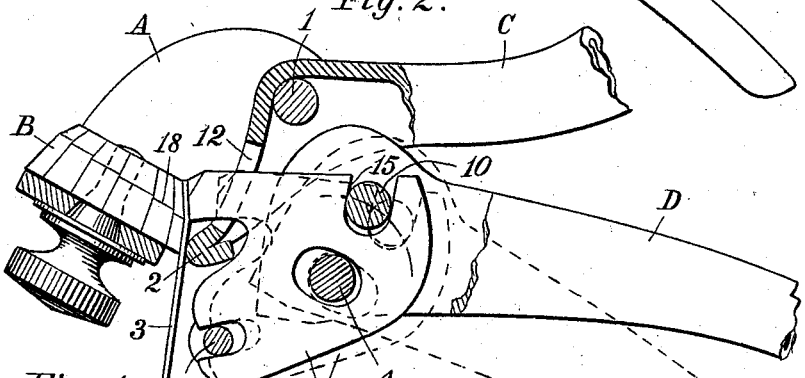
Figure 4:
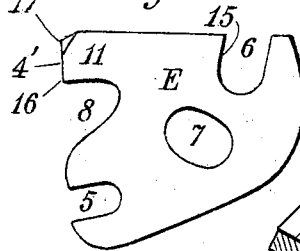
Figure 3:
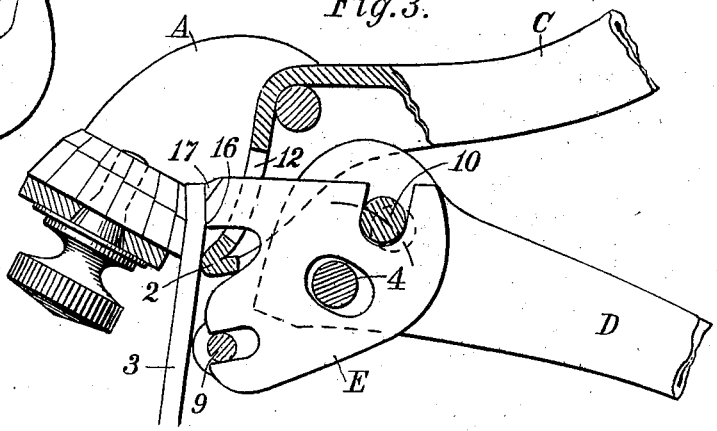

In the accompanying drawing forming part of this specification, Figure 1 is a side elevation of a saw-set embodying the improvements of the present invention. Fig. 2 is an enlarged vertical section, partly in elevation, showing the operation of the plunger on a thin saw. Fig. 3 is a view similar to Fig. 2, showing the operation of the plunger on a thick saw. Fig. 4 is a detail view of the plunger.

Like reference characters indicate corresponding parts in the different figures of the drawing.

The reference letter A represents a head; B an anvil adjustably mounted on the head A in a well known manner; C a clamping lever; D an operating lever; E a plunger; and F a spring.

The head A, adjustable anvil B, and clamping lever C may be of any suitable form and construction, such as is well known in the art. The clamping lever C is pivotally connected with the head A, as indicated at 1, and is provided with a clamping member 2, which is adapted to clamp or hold the saw blade 3 against the larger end of the anvil B, as shown in Figs. 2 and 3.

The operating lever D is pivotally connected with the head A, as indicated at 4. The plunger E, as shown clearly in Fig. 4, consists preferably of a plate of metal having a face 4', which is adapted to contact with the saw teeth during the operation of setting the same.

The plunger E preferably is shaped as illustrated in Fig. 4, so as to provide slots or openings 5, 6, 7, and 8, the slots 5 and 6 preferably being open-ended as shown.

The plunger E is mounted between the two walls of the head A in such manner that the slot 5 therein, is loosely engaged by a pin 9, which is secured to the head and extends transversely from wall to wall thereof. The slot 6 in the plunger E is loosely engaged by a pin 10, which is secured to and extends transversely across the operating lever D and moves about the pivot point 4 of said operating lever during the movement of the lever, it being understood that both the operating lever D and clamping lever C preferably are formed of pieces of metal of approximate U-shape in cross-section. The slot 7 of the plunger E is of sufficient size to permit the plunger to work loosely about the pin 4 of the head A. The portion 11 of the plunger E which carries the operating face 4' preferably is adapted to extend outward through the slot 12 cut through the clamping member 2 of the clamping lever C.

Levers C and D are pressed normally apart by means such as a spring F.

Constructed as described, the operation of the saw setter is as follows: Before the saw blade is engaged by the saw setter, the levers C and D are separated by the spring F, and the plunger E and operating lever D are in the position indicated by the dotted lines in Fig. 2. As the levers C and D are pressed together and the tool engages with the saw blade, the plunger moves from the dotted line position to the full line position. This movement of the plunger is caused by the engagement of the pin 10 on the operating lever D with the wall 15 of the plunger. This engagement of the pin 10 with the wall 15 causes the plunger to move toward the saw blade, the pin 9 on the head A, of course, permitting the walls of the slot 5 to slide thereon. The portion of the engaging face 4' adjacent the corner thereof marked 16, first engages the saw blade 3 adjacent the base of the tooth. At this time the opposite end of the operating face 5, which is indicated by the reference numeral 17, is either entirely out of engagement with the point of the saw tooth or very lightly in engagement therewith. The continued movement of the pin 10 of the operating lever D around the pivot member 4, after the portion 16 of the operating face 4' has engaged the saw tooth adjacent the base thereof, causes the saw tooth to be pressed tightly against the lower face of the anvil B adjacent the angle 18 between the upper and lower faces thereof; and the plunger E then begins to swing upon the portion 16, which acts as a fulcrum, so that the opposite end 17 of the face 4' gradually pushes the pointed end of the saw tooth flat against the upper face of the anvil and sets the same, it being understood that during this setting operation the clamping member 2 of the lever C holds the saw blade against the lower face of the anvil B. It will also be understood that after the portion 16 of the plunger E engages the saw adjacent the base of the tooth and the plunger begins to swing on said point as a fulcrum so as to swing the point 17 toward the anvil, the walls of the slot 5, of course, move slightly in the opposite direction with respect to the pin 9 of the head. By causing the plunger first to engage the tooth adjacent the base thereof and then subsequently to exert pressure against the tooth adjacent the point to set the same, liability of cracking the tooth is avoided, as the portion 16 of the plunger bears tightly against the tooth adjacent its base during the setting operation and clamps or compresses the fibers of the metal at that portion of the saw so as to prevent the formation of a crack, and also to compress or set the tooth so as to prevent it from springing back to its original position.

The improved saw set, of this invention, is adapted to act in exactly the same way on either a thin saw or a thick saw, as the plunger does not begin to swing on the point 16 as a fulcrum until it is directly in contact with the saw blade. Therefore, the plunger, in operating on a thin saw such as illustrated in Fig. 2, moves a greater distance toward the anvil B before it begins to swing on the fulcrum 16, than it does in Fig. 3 where it is acting on a thick saw blade, in which case the plunger moves only a short distance before the portion 16 engages the base of the tooth and serves as a fulcrum.

The improved saw set is strong, simple, durable, and inexpensive in construction, as well as thoroughly efficient and automatic in its action.

What is claimed is:

1. A saw set having an anvil, a head, clamping means coöperative with the anvil, an operating lever, and a rocking plunger having a slidable engagement at one point with the head, and a slidable engagement at another point with the operating lever for susbtantially the purposes set forth.

2. A saw set having an anvil, a head, clamping means coöperative with the anvil, a rocking one-piece plunger having a slidable connection with the head, and means for swinging the plunger toward and from the anvil for substantially the purposes set forth.

3. A saw set having an anvil, a head, clamping means coöperative with the anvil, an operating lever, and a plunger having a pin and slot connection at one point with the head, and a pin and slot connection at another point with the operating lever for substantially the purposes set forth.

4. A saw set comprising a head, an anvil, clamping means coöperative with the anvil, an operating lever, a plunger having a plurality of slots, a pin on said head having a loose connection with one of said slots a pivot pin for said operating lever having a loose connection with one of the slots of said plunger, and a pin on said operating lever having a loose connection with the other of said slots.

5. A saw set comprising a head, an anvil, a clamping lever pivotally connected with said head and having a clamping member adapted to coöperate with said anvil, an operating lever pivotally connected with said head, a plunger having a plurality of slots, a pin connected with said head and loosely engaging one of the slots of said plunger, a pivot pin for said operating lever having a loose connection with one of the slots of said plunger and a pin connected with said operating lever and loosely engaging the other of said slots.

In testimony whereof, I have hereunto set my hand in the presence of two subscribing witnesses.

CHARLES C. TAINTOR.

Witnesses:
ADOLPH F. DINSE,
CHARLES A. SCHEUBER.